US008487536B1

(12) United States Patent
Hagen et al.

(10) Patent No.: US 8,487,536 B1

(45) Date of Patent: Jul. 16, 2013

(54) DENSE PLASMA FOCUS DEVICE AND METHOD

(75) Inventors: Edward Christopher Hagen, Las Vegas, NV (US); Bernard Timothy Meehan, III, Las Vegas, NV (US)

(73) Assignee: National Security Technologies, LLC, Las Vegas, NV (US)

( * ) Notice: Subject to any disclaimer, the term of this patent is extended or adjusted under 35 U.S.C. 154(b) by 322 days.

(21) Appl. No.: 12/455,278

(22) Filed: May 29, 2009

(51) Int. Cl.

| | |
|---|---|
| ***H01J 7/24*** | (2006.01) |
| ***H05B 31/26*** | (2006.01) |
| ***G01D 18/00*** | (2006.01) |
| ***G12B 13/00*** | (2006.01) |
| ***B23K 9/00*** | (2006.01) |
| ***B23K 9/02*** | (2006.01) |

(52) U.S. Cl.
USPC ............... 315/111.01; 250/252.1; 219/121.36

(58) Field of Classification Search
USPC .................................. 315/111.01; 250/252.1
See application file for complete search history.

(56) References Cited

U.S. PATENT DOCUMENTS

2005/0271181 A1* 12/2005 Winterberg .................. 376/144
2006/0273732 A1* 12/2006 Korobochko et al. ... 315/111.21
2008/0089460 A1* 4/2008 Sved ............................ 376/195

* cited by examiner

*Primary Examiner* — Jacob Y Choi
*Assistant Examiner* — Henry Luong
(74) *Attorney, Agent, or Firm* — Weide & Miller, Ltd.

(57) ABSTRACT

A dense plasma focus device is disclosed as having an anode with a non-constant radius and a cathode coupled to the anode, the cathode also having a non-constant radius. The anode and/or the cathode may be tapered. In addition, a ratio of the non-constant radius of the anode and the non-constant radius of the cathode may be held constant along the length of the dense plasma focus device in order to maintain constant inductance. Alternatively, the inductance may be varied by varying the ratio of the anode and cathode radii along the length of the dense plasma focus device.

18 Claims, 5 Drawing Sheets

DENSE PLASMA FOCUS DEVICE AND METHOD

FIELD OF THE INVENTION

The disclosed embodiments relate generally to plasma machines, and more specifically to dense plasma focus devices.

BACKGROUND OF THE INVENTION

A dense plasma focus device is a plasma machine that produces, by electromagnetic acceleration and compression, short-lived plasma that is so hot and dense that the dense plasma focus device becomes a copious multi-radiation source. The basic dense plasma focus device was invented in the early 1960s by J. W. Mather and also independently invented by N. V. Filippov.

The standard Mather design for a dense plasma focus device is characterized by coaxial cylindrical anodes and cathodes. Since the inductance of the anode/cathode ("a/k") assembly of the dense plasma focus device is a function of the ratio of the radii of the anode and the cathode, the "Mather" design is a constant inductance design.

SUMMARY OF THE INVENTION

In one embodiment, a dense plasma focus device is disclosed as having an anode with a non-constant radius and a cathode coupled to the anode, the cathode also having a non-constant radius. In various embodiments, the anode and cathode may be coaxially coupled. In other embodiments the anode and/or the cathode may be tapered. In addition, a ratio of the non-constant radius of the anode and the non-constant radius of the cathode may be held constant along the length of the dense plasma focus device in order to maintain constant inductance. In other embodiments, the inductance may be varied by varying the ratio of the anode and cathode radii along the length of the dense plasma focus device.

DETAILED DESCRIPTION

The word "exemplary" is used herein to mean "serving as an example, instance, or illustration." Any embodiment described herein as "exemplary" is not necessarily to be construed as preferred or advantageous over other embodiments. In addition, references to "an," "one," "other," "another," "alternative," or "various" embodiments should not be construed as limiting since various aspects of the disclosed embodiments may be used interchangeably within other embodiments.

Figure 1:
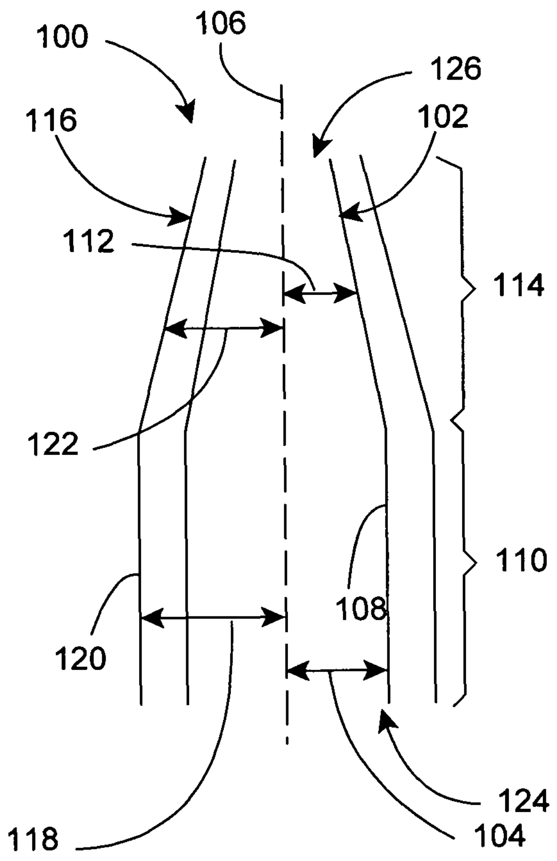
FIG. 1 is a cross-sectional view of one embodiment of a dense plasma focus device.

Reference is now made to the figures wherein like parts are referred to by like numerals throughout. Referring first to FIG. 1, a cross-sectional view of one embodiment of a dense plasma focus device is shown. For example, the dense plasma focus device 100 includes an anode 102, which may function as a positive electrode of the dense plasma focus device 100. Contrary to conventional the dense plasma focus device designs that utilize cylindrical electrodes (e.g., anodes and cathodes), the radius of the anode 102 is non-constant, meaning that the radius of the anode 102 changes at some point along the length of the anode 102. An example of such a non-constant radius can be seen in FIG. 1.

Specifically, the radius 104 of the anode 102 represents a distance between a centerline 106 of the dense plasma focus device 100 and the outer surface 108 of the anode 102. The radius 104 is the radius of the anode 102 along a proximal section 110 of the dense plasma focus device 100. However, the radius of the anode 102 decreases (e.g., is non-constant) along the length of the anode 102. For example, the radius 112 of the anode 102, which represents the distance between centerline 106 of the dense plasma focus device 100 and outer surface 108 of the anode 102, is continually decreasing throughout the distal section 114 of the dense plasma focus device 100.

The dense plasma focus device 100 also includes a cathode 116, which is coupled to the anode 102 and disposed coaxially relative to the anode 102. Cathode 116 may function as a negative electrode of the dense plasma focus device 100. Similar to the radius of the anode 102, the radius of the cathode 116 is also non-constant. For example, the radius 118 of the cathode 116 represents a distance between centerline 106 of the dense plasma focus device 100 and outer surface 120 of the cathode 116. The radius 118 is the radius of the cathode 116 along proximal section 110 of the dense plasma focus device 100. However, the radius of the cathode 116 decreases (e.g., is non-constant) along the length of the cathode 116. Specifically, the radius 122 of the cathode 116, which represents the distance between centerline 106 of the dense plasma focus device 100 and outer surface 120 of the cathode 116, is continually decreasing throughout the distal section 114 of the dense plasma focus device 100.

Thus, both the radius of the anode 102 and the radius of the cathode 116 are non-constant (e.g., change) at some point between a proximal end 124 of the dense plasma focus device 100 and a distal end 126 of the dense plasma focus device 100. In the embodiment shown in FIG. 1, the ratio of the non-constant radius of the anode and the non-constant radius of the cathode is constant. By maintaining a constant ratio of the radii along the length of the dense plasma focus device 100, the inductance of the dense plasma focus device 100 is also held constant.

It is also worth noting that due to the non-constant nature of the radii of the anode 102 and the cathode 116, the termination end geometry (in size, shape, or the like) of the anode 102 and the cathode 116 at distal end 126 may be different than the initial end geometry (in size, shape, or the like) of the anode 102 and the cathode 116 at proximal end 124.

Figure 2:
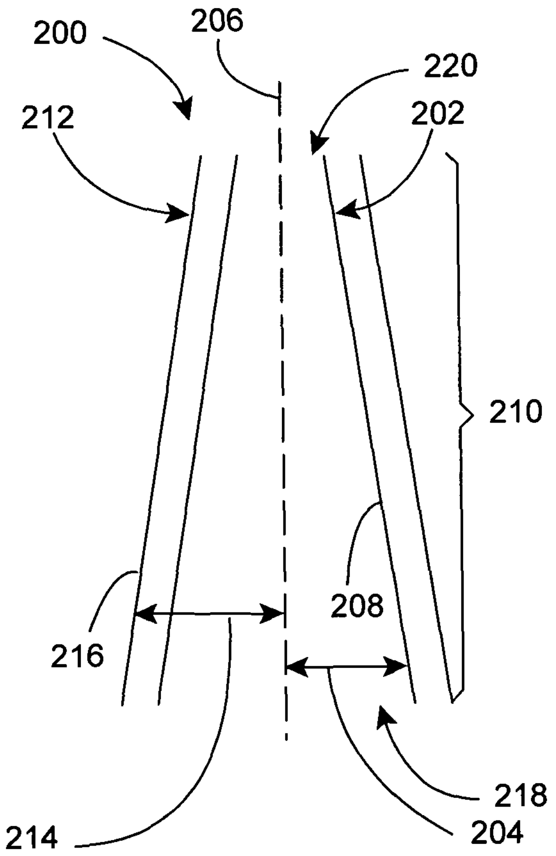
FIG. 2 is a cross-sectional view of an alternative embodiment of a dense plasma focus device.

Referring now to FIG. 2, a cross-sectional view of another embodiment of a dense plasma focus device is shown. The dense plasma focus device 200 of FIG. 2 includes an anode 202, which may function as a positive electrode of the dense plasma focus device 200. Similar to the anode 102 of the dense plasma focus device 100 of FIG. 1, the radius of the anode 202 is non-constant, meaning that the radius of the anode 202 changes at some point along the length of the anode 202. The non-constant nature of the radius of the anode 202 can be seen in FIG. 2.

Specifically, the radius 204 of the anode 202 represents a distance between a centerline 206 of the dense plasma focus device 200 and an outer surface 208 of the anode 202. As seen in FIG. 2, the radius 204 of the anode 202 decreases (e.g., is non-constant) along length 210 of the anode 202. In this regard it is worth noting that although the anode 202 is generally tapered throughout length 210 of the dense plasma focus device 200, only a portion of the anode 202 may be tapered in other embodiments (e.g., as shown by the anode 102 of FIG. 1).

The dense plasma focus device 200 also includes a cathode 212, which is coupled to the anode 202 and disposed coaxially relative to the anode 202. Cathode 212 may function as a negative electrode of the dense plasma focus device 200. Similar to the radius of the anode 202, the radius of the cathode 212 is also non-constant. For example, the radius 214 of the cathode 212 represents a distance between a centerline 206 of the dense plasma focus device 200 and an outer surface 216 of the cathode 212. The radius 214 of the cathode 212 decreases (e.g., is non-constant) along length 210 of the cathode 212. Similar to the anode 202, although the cathode 212 is generally tapered throughout length 210 of the dense plasma focus device 200, only a portion of the cathode 212 may be tapered in other embodiments (e.g., as shown by the cathode 116 of FIG. 1).

Thus, both the radius of the anode 202 and the radius of the cathode 212 are non-constant (e.g., change) at some point between proximal end 218 of the dense plasma focus device 200 and distal end 220 of the dense plasma focus device 200. In the embodiment shown in FIG. 2, the ratio of the non-constant radius of the anode and the non-constant radius of the cathode is constant. By maintaining a constant ratio of the radii along length 210 of the dense plasma focus device 200, the inductance of the dense plasma focus device 200 is also held constant.

Figure 3:
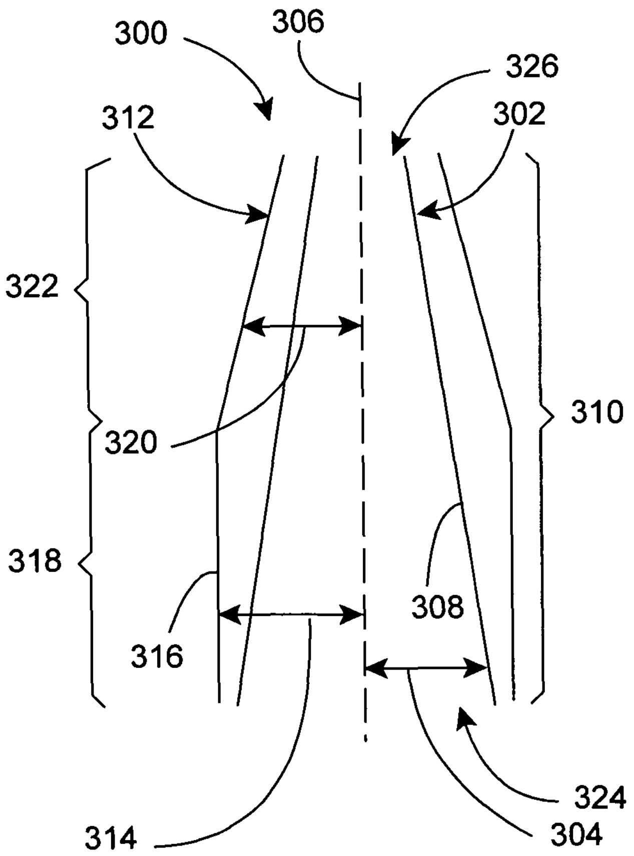
FIG. 3 is a cross-sectional view of another alternative embodiment of a dense plasma focus device.

Referring now to FIG. 3, a cross-sectional view of another embodiment of a dense plasma focus device is shown. The dense plasma focus device 300 of FIG. 3 includes an anode 302, which may function as a positive electrode of the dense plasma focus device 300. Similar to the anode 202 of the dense plasma focus device 200 of FIG. 2, the radius of the anode 302 is non-constant, meaning that the radius of the anode 302 changes at some point along the length of the anode 302. The non-constant nature of the radius of the anode 302 can be seen in FIG. 3.

Specifically, the radius 304 of the anode 302 represents a distance between a centerline 306 of the dense plasma focus device 300 and an outer surface 308 of the anode 302. As seen in FIG. 3, the radius 304 of the anode 302 decreases (e.g., is non-constant) along length 310 of the anode 302. In this regard it is worth noting that although the anode 302 is generally tapered throughout length 310 of the dense plasma focus device 300, only a portion of the anode 302 may be tapered in other embodiments (e.g., as shown by the anode 102 of FIG. 1).

The dense plasma focus device 300 also includes a cathode 312, which is coupled to the anode 302 and disposed coaxially relative to the anode 302. Cathode 312 may function as a negative electrode of the dense plasma focus device 300. Similar to the radius of the anode 302, the radius of the cathode 312 is also non-constant. For example, the radius 314 of the cathode 312 represents a distance between centerline 306 of the dense plasma focus device 300 and outer surface 316 of the cathode 312. The radius 314 is the radius of the cathode 312 along proximal section 318 of the dense plasma focus device 300. However, the radius of the cathode 312 decreases (e.g., is non-constant) along the length of the cathode 312. Specifically, the radius 320 of the cathode 312, which represents the distance between a centerline 306 and an outer surface 316 along distal section 322, is continually decreasing.

Thus, both the radius of the anode 302 and the radius of the cathode 312 are non-constant (e.g., change) at some point between proximal end 324 of the dense plasma focus device 300 and distal end 326 of the dense plasma focus device 300. In the embodiment shown in FIG. 3, the ratio of the non-constant radius of the anode and the non-constant radius of the cathode varies at some point over the length 310 of the dense plasma focus device 300. By varying the ratio of the radii along the length 310 of the dense plasma focus device 300, the inductance of the dense plasma focus device 300 may be varied in order to advantageously adjust the output characteristics of the dense plasma focus device 300.

In this regard, although FIG. 3 shows a dense plasma focus device with an anode that is tapered along the entire length of the dense plasma focus device and a cathode that is only tapered along a portion of the length of the dense plasma focus device, many other configurations could be used to vary the ratio of the radii of the anode and the cathode to produce different inductance characteristics. For example, the cathode may be tapered along the entire length of the dense plasma focus device and the anode may only be tapered along a portion of the length of the dense plasma focus device. Alternatively, both the anode and the cathode may be tapered along the entire length of the dense plasma focus device but with the anode and the cathode having different taper angles. Similarly, a portion of the anode and the cathode may be cylindrical with a portion of the anode and the cathode being tapered with different taper angles. These examples are for illustration and are not considered exhaustive of the many different manners in which the inductance could be varied by varying the ratio of the radii of the anode and the cathode.

Figure 4:
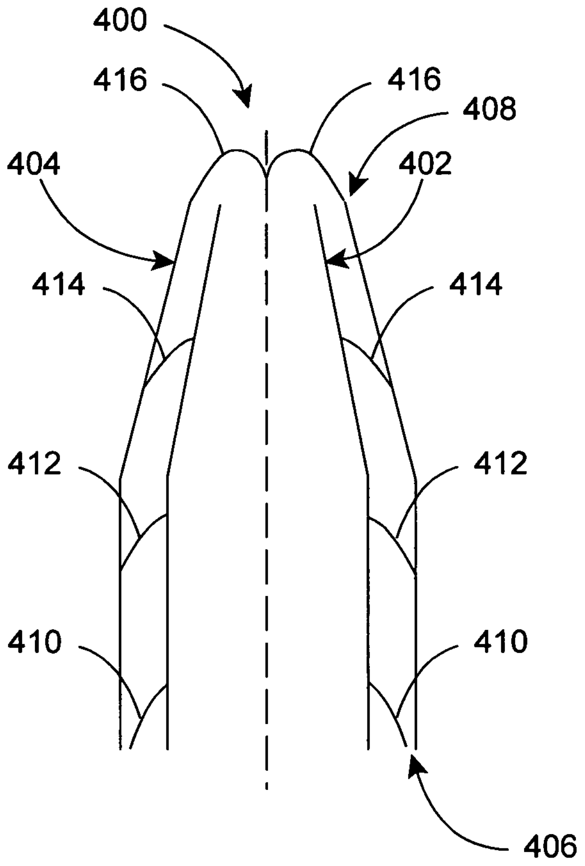
FIG. 4 is a cross-sectional view of the device of FIG. 1 in operation.

Referring now to FIG. 4, a cross-sectional view of the dense plasma focus device 400, which is similar to the dense plasma focus device 100 of FIG. 1, is shown in operation. First, a charged bank of electrical capacitors (not shown) is switched onto the anode 402, and gas within the dense plasma focus device 400 breaks down. It is contemplated that any type of gas, including hydrogen, deuterium, tritium, oxygen, nitrogen, the noble gasses (e.g. helium, neon, argon, xenon, krypton, radon), or the like may be used. Similarly, it is contemplated that complex gasses, such as decaborane, could be used. It is also contemplated that materials in other phases, such as solids, liquids, or the like, may be vaporized to be part of interactions, both nuclear and chemical. A rapidly rising electric current flows axisymmetrically between the anode 402 and the cathode 404 from proximal end 406 of the dense plasma focus device 400 towards distal end 408 of the dense plasma focus device 400. The electric current becomes an axisymmetric sheath of plasma that is accelerated axially from position 410 to position 412 and then to position 414, ending the axial phase of operation.

The whole process proceeds at many times the speed of sound in the ambient gas. As the current sheath continues to move axially, the portion in contact with the anode 402 slides across the face of the anode, axisymmetrically. When the imploding front of the shock wave coalesces onto the axis, a reflected shock front 416 emanates from the axis until it meets the driving current sheath which then forms the axisymmetric boundary of the "pinched" or focused hot plasma column.

The dense plasma column rapidly "pinches" and undergoes instabilities and breaks up. The intense electromagnetic and particle bursts, collectively referred to as 'multi-radiation' occur during the dense plasma and breakup phases. The whole process, including axial and radial phases, may last, for a conventional Mather dense plasma focus device, a few microseconds (for a small focus) to 10 microseconds (for a large focus). However, the pulsewidth of a dense plasma focus device with non-constant radii of the anode and the cathode, has been measured to be less than 50 nanoseconds (and even as low as 10 nanoseconds), which is significantly less than conventional Mather designs that may have a pulsewidth of many hundreds of nanoseconds. The full width at half maximum ("FWHM") is usually measured on the detector as the width of the radiation burst from the Z-pinch in time. In the present invention, it is understood that the FWHM occurs during a small fraction of time at the end of the radial implosion phase. This reduction of pulsewidth may be achieved using the principles of the embodiments disclosed herein (e.g., utilizing a dense plasma focus device with an anode and a cathode with non-constant radii).

The goal of pulsewidth reduction for the dense plasma focus device is twofold: eliminating multiple pulses and reducing the duration of the pinch. Under some circumstances, the dense plasma focus device generates several small pulses spaced closely in time instead of one relatively larger pulse. For most experiments requiring short duration neutron pulses, this problem may be worse than long duration neutron pulses since it obscures the times of interest in the experiment.

The other major effect on the duration of the neutron pulse is the radial stability of the plasma shockwave. This is primarily controlled by operating voltages, experimental gas parameters, and insulator height. These factors combine to determine the strength and stability of the plasma shockwave as it travels down the bore of the plasma focus tube. An additional factor that determines the stability of the plasma shockwave as it reaches the end of the anode in the plasma focus tube is the height of the cathode cage. All of these design characteristics may be altered as needed to obtain the desired output characteristics of the dense plasma focus device.

For example, the dense plasma focus device can be used for a variety of research and non-research tasks. Among the non-research tasks is providing a pulsed neutron output for characterizing neutron detectors for the national laboratories. Many of the neutron detectors that are tested with the dense plasma focus device are for measuring pulsed neutron outputs in strong gamma and x-ray backgrounds. Having the ability to produce pulses similar to those that clients expect to see in their experiments is a great benefit to those clients using the embodiments of the dense plasma focus device disclosed herein to operationally test detectors and diagnostic systems.

Figure 5:
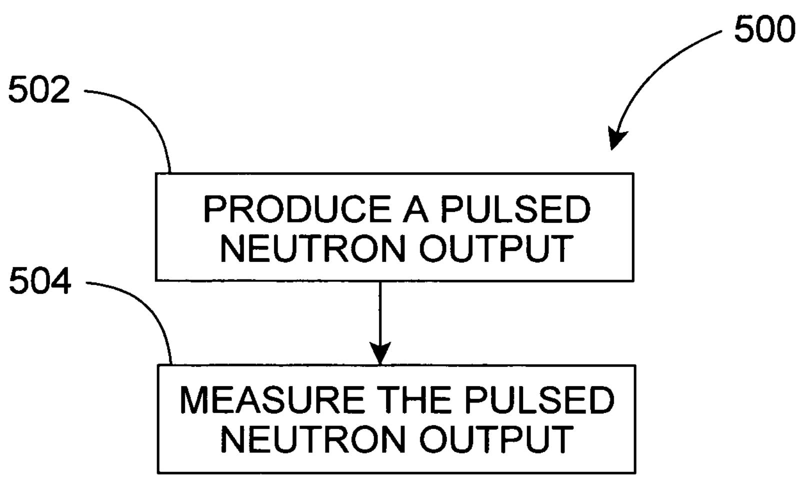
FIG. 5 is a method of testing a neutron detector with a dense plasma focus device.

Referring now to FIG. 5, a method 500 of testing a neutron detector is shown. First, a pulsed neutron output is produced at step 502. The pulsed neutron output may be produced with an apparatus (e.g., a dense plasma focus device) comprising an anode having a non-constant radius and a cathode coupled to the anode, the cathode having a non-constant radius. At step 504, the pulsed neutron output is measured with the neutron detector. Since the pulsed neutron output of the dense plasma focus device is known in advance, characteristics (e.g., sensitivity, calibration, etc.) of the neutron detector can be determined by comparing the measurements obtained by the neutron detector with the known characteristics of the pulsed neutron output of the dense plasma focus device.

Although the steps of FIG. 5 have been discussed and depicted within a particular order, one of skill in the art should understand that the steps can be performed in a different order or otherwise interchanged without departing from the scope of the various embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to make or use the disclosed embodiments. Various modifications to these embodiments will be readily apparent to those skilled in the art, and the generic principles defined herein may be applied to other embodiments without departing from the spirit or scope of these principles. Thus, the disclosed embodiments are not intended to be limited as described herein but are to be accorded the widest scope consistent with the principles and novel features disclosed herein.

What is claimed is:

1. An apparatus, comprising:

an anode having a non-constant radius;

a cathode positioned around said anode such that said cathode surrounds said anode and said cathode and anode are coaxial, the cathode having a non-constant radius, said anode and said cathode positioned to form a void between said anode and cathode; and a power source, said power source adapted to supply electric current to said cathode and said anode to form a plasma sheath from a gas inside said void between said cathode and said anode.

2. The apparatus of claim 1, wherein a ratio of the non-constant radius of the anode and the non-constant radius of the cathode is constant.

3. The apparatus of claim 1, wherein a ratio of the non-constant radius of the anode and the non-constant radius of the cathode varies.

4. The apparatus of claim 1, wherein the anode has a termination that is different from an initial end geometry.

5. The apparatus of claim 4, wherein the anode is tapered.

6. The apparatus of claim 1, wherein the cathode has a termination that is different from an initial end geometry.

7. The apparatus of claim 6, wherein the cathode is tapered.

8. A dense plasma focus device, comprising:

an anode having a non-constant radius;

a cathode positioned around said anode such that said cathode surrounds said anode and said cathode and anode are coaxial, the cathode having a non-constant radius, wherein a ratio of the non-constant radius of the anode and the non-constant radius of the cathode is constant and said anode and said cathode are positioned to form a void between said anode and said cathode; and a power source, said power source adapted to supply electric current to said cathode and said anode to form a plasma sheath from a gas inside said void between said cathode and said anode.

9. The dense plasma focus device of claim 8, wherein the anode has a termination that is different from an initial end geometry.

10. The dense plasma focus device of claim 9, wherein the anode is tapered.

11. The dense plasma focus device of claim 8, wherein the cathode has a termination that is different from an initial end geometry.

12. The dense plasma focus device of claim 11, wherein the cathode is tapered.

13. A dense plasma focus device, comprising:

an anode having a non-constant radius;

a cathode positioned around said anode such that said cathode surrounds said anode and said cathode and anode are coaxial, the cathode having a non-constant radius, wherein a ratio of the non-constant radius of the anode and the non-constant radius of the cathode varies and said anode and said cathode are positioned to form a void between said anode and said cathode; and a power source, said power source adapted to supply electric current to said cathode and said anode to form a plasma from a gas inside said void between said cathode and said anode.

14. The dense plasma focus device of claim 13, wherein the anode has a termination that is different from an initial end geometry.

15. The dense plasma focus device of claim 14, wherein the anode is tapered.

16. The dense plasma focus device of claim 13, wherein the cathode has a termination that is different from an initial end geometry.

17. The dense plasma focus device of claim 16, wherein the cathode is tapered.

18. A method of testing a neutron detector, comprising:

providing an apparatus comprising an anode having a non-constant radius, and a cathode positioned around said anode such that said cathode surrounds said anode and said cathode and anode are coaxial, the cathode having a non-constant radius, said anode and said cathode positioned to form a void between said anode and said cathode;

supplying electric current to said apparatus to form a plasma from a gas inside said void between said cathode and said anode, said plasma producing a pulsed neutron output at an end of said apparatus; and measuring the pulsed neutron output with the neutron detector.

* * * * *